United States Patent Office 3,578,479
Patented May 11, 1971

3,578,479
METHOD OF SEALING LEAKS IN
VESSELS AND JOINTS
Joseph J. Packo, 3043 N. Federal Highway,
Fort Lauderdale, Fla. 33306
No Drawing. Filed Oct. 29, 1968, Ser. No. 771,622
Int. Cl. B23p 7/00
U.S. Cl. 117—2                                   11 Claims

ABSTRACT OF THE DISCLOSURE

The invention relates to a method for sealing leaks in pipes, conduits, gas lines, closed containers, tanks and the like. The interior of such equipment is first purged with a non-reactive dry gas, such as nitrogen, to remove any moisture and/or oxygen which may be present. Then a selected sealant agent is introduced into the interior of the equipment in a suitable inert gas vehicle under pressure. The sealant and gas mixture will escape from any leaks present in the equipment into the outer ambient atmosphere. The sealant reacts with oxygen and/or moisture to form in the situs of the leak a solid reaction product which may be a metal oxide compound. The sealant agents used are normally gaseous or volatile metal hydrides, metal alkyls, metal alkyl halides, and metal alkyl hydrides. Examples of these sealant agents are silicon hydrides, alkyl aluminum halides, zinc alkyls such as diethyl zinc. The sealants are supplied to the interior of the apparatus or vessel which may contain leaks in sufficient concentration and suitable pressure so that upon escape from the leaks a solid seal will form in situ.

FIELD OF THE INVENTION

This invention relates to sealing leaks in pipes, conduits, closed containers, tanks, and closed systems adapted to contain fluids therein, hereinafter referred to generally as "vessel." The invention is particularly adapted for sealing very small leaks in buried piping systems used for conveying fuel gas and also for sealing leaks in telephone conduits containing nitrogen or other inert gas under pressure.

SUMMARY OF THE INVENTION

According to this invention the sealant is introduced into the interior of the vessel under pressure in gaseous form or in a suitable inert gaseous vehicle. When the sealant escapes through any existing leak in the vessel it reacts with oxygen and moisture present at the ambient exterior locus of the vessel where the leak exists and forms a solid product in situ which seals the leak. The sealants suitable for this invention are selected normally gaseous or volatile metal hydrides, metal alkyls, metal alkyl halides, and metal alkyl hydrides. These sealant agents are mixed with a non-reactive vehicle gas, such as hydrogen, helium or nitrogen in amount so that upon escape of the admixed gas from a leak into the atmosphere a seal will be produced. These sealants are preferably substances which are easily volatilized and which can be admixed with the inert vehicle gas and carried along with the gas in the vessel. If a leak is present the sealant upon escape into the atmosphere reacts with the oxygen and/or moisture in the ambient air to produce a solid seal at the situs of the leak.

Sealant agents suitable for admixing with vehicle gases may be selected silicon hydrides and boron hydrides. The agents may also be compounds having the general formula:

$$MR_nX_{3-n}$$

wherein M is aluminum or boron; R is an aliphatic or olefinic straight chain, branched chain or cyclic organic group having 1 to 10 carbon atoms; X is hydrogen or a halogen selected from the group of chlorine, bromine, iodine and fluorine; and $n$ is an integer of at least 1.

Specific illustrative sealant agents are triethyl aluminum, ethyl aluminum sesquichloride, diethyl aluminum chloride, ethyl aluminum dichloride, diisobutyl aluminum chloride, monoisobutyl aluminum dichloride, triisobutyl aluminum, aluminum diethyl hydride, methyl aluminum sesquichloride, diisobutyl aluminum hydride, triisohexyl aluminum, tri-n-hexyl aluminum, tri-n-octyl aluminum, tri-nbutyl aluminum, tri-n-decyl aluminum, aluminum isoprenyl, tri-n-propyl aluminum, triisopropyl aluminum, and tricyclohexyl aluminum. Boron compounds analogous to the aforementioned aluminum compounds may be used such as boron triethyl, boron diethyl bromide, etc.

Other suitable sealant agents are alkoxide boranes having the general formula:

$$R_nB(OR')_{3-n}$$

wherein R is an aliphatic straight chain, branched chain or cyclic organic group having 1 to 10 carbon atoms, R' is an alkyl group having 1 to 3 carbon atoms, and $n$ is an integer of 0 to 3. Examples of these sealant agents are $B(OCH_3)_3$ (trimethoxide borane) and $$CH_3B(OC_2H_5)_2$$

(methyldiethoxy borane). These boron alkoxides react with moisture to form a solid plug containing boric acid which serve to seal any leaks present upon escape into the atmosphere containing moisture.

Other suitable sealant agents may be compounds having the formula:

$$ZR_nX_{2-n}$$

wherein Z is zinc or cadmium; R is an aliphatic straight chain, branched chain or cyclic organic group having 1 to 10 carbon atoms; X is hydrogen or a halogen from the group of chlorine, bromine, iodine and fluorine; and $n$ is an integer of at least 1.

Illustrative specific sealant compounds are diethyl zinc, di-n-butyl zinc, diethyl cadmium, diisobutyl cadmium, dioctyl zinc, and dicyclohexyl zinc.

These sealant agents may be added to vehicle gases in concentrations ranging from about 0.005 to about 10% by weight in the vehicle gases. They may also be conveniently added in solutions of suitable hydrocarbons, such as butane, hexane, heptane, etc. which will uniformly volatilize or disperse in the vehicle gas. When the admixed gases escape into the atmosphere they produce in situ a solid seal.

ILLUSTRATIVE EXAMPLES

The following are illustrative examples in practicing this invention:

Two holes $\frac{1}{32}''$ and $\frac{1}{16}''$ were drilled into a three foot length of standard lead telephone conduit. Dry nitrogen was passed through the conduit for 18 hours to dry the conduit prior to starting the flow of the sealant. The room temperature ranged from 68° to 76° F. and the relative humidity was 48% to 54% during the run. Diethyl zinc in approximately a concentration of 500 p.p.m. was then supplied in the nitrogen stream. It was found that lower pressures and slower flow rates were required for sealing the holes. All holes sealed themselves, but varied in the time required. The $\frac{1}{32}''$ hole sealed in 2¼ hours, at a pressure of ¾ to 1 pound.

It took approximately 3¼ hours to seal the $\frac{1}{16}''$ hole at ½ lb. pressure. Increasing pressure to 1 lb. opened the hole again. It was found that, if after the leak had been sealed and the pressure was not increased until several hours later, greater pressure could be applied before the hole opened up again. The hole was again sealed and then allowed to stand for 18 hours before increasing the pressure. This time a leak did not develop until 11 lbs. pressure was reached. It was found that if after the hole is sealed, the pressure is not increased until many hours have elapsed, there is a hardening of the zinc oxide complex which is deposited in the situs of the hole that will withstand higher pressures.

Other sealant agents which may be used in like manner are triethyl aluminum, triethyl borane, and ethyl aluminum sesquichloride. A mixture of 85% triethyl borane and 15% diethyl zinc is suitable for admixture with helium, hydrogen or nitrogen gas in amounts 0.05 to 25%. A hydrocarbon solution containing 25% by weight triethyl aluminum containing a trace of diethyl zinc may also be added to a vehicle gas and volatilized therein.

It will be apparent that the concentration of the sealant used and the pressure of the vehicle gas used may be varied over a wide range depending upon the size of the holes which are to be sealed. The time of flow of the sealant composition can also be greatly varied in order to seal existing leaks. The metal component of the sealant agent forms solid metal oxide and metal alkoxides complexes when it escapes from the leak into the ambient atmosphere by reacting with oxygen and/or moisture to form solids in situ which in time harden and seal the leak.

The present invention is also suitable for sealing leaks in joints of fuel gas pipelines which comprise bell and spigot joints. Such joints are packed with caulked jute or other fibrous materials. Such joints tend to dry out and cause leaks especially when the pipelines are used to convey natural fuel gas which is extremely dry.

Fuel gas lines buried underground in cities are also subjected to earth heaving and vibration caused by vehicles and trucks of the street traffic which produce leaks at the joints. The repair of such leaks is very costly because sections of the gas main must be exposed by excavating the superposed soil to gain access to the leaking joints for resealing them. According to the present invention excavations are entirely eliminated. The sealant agent is simply fed in a suitable gas vehicle through the pipeline for a sufficient time until the leak is sealed.

Inasmuch as the sealants which are used in the present invention react with oxygen and/or moisture in the air when they initially escape from any existing leaks in a vessel they produce a visible smoke which serves to locate the situs of the leak. After a lapse of time the leak is sealed as previously explained, but if the seal is broken again it will be automatically resealed if the sealant is present in the interior of the vessel. In the case of systems and pipelines which convey a stream of fluid a selected sealant may be supplied to the stream at all times in suitable concentrations so that any leaks which may develop will be automatically sealed when the sealant escapes.

I claim:
1. The method of sealing leaks in a vessel and the like adapted for containing a fluid therein which comprises the steps of introducing into the interior of said vessel a gaseous or volatilized sealant agent admixed with a vehicle gas inert thereto, applying pressure on the interior of said vessel sufficient to permit escape of said sealant agent from a leak present in said vessel into the ambient environment at prevailing temperature conditions and for a period of time sufficient to react with oxygen or moisture present in said environment to form a solid seal in the situs of the leak.

2. The method of claim 1, wherein the sealant agent is a compound selected from the group consisting of silicon hydrides and boron hydrides; a compound having the formula:

$$MR_nX_{3-n}$$

wherein M is aluminum or boron; R is an aliphatic or olefinic straight chain, branched chain or cyclic organic group having 1 to 10 carbon atoms; X is hydrogen or a halogen selected from the group of chlorine, bromine, iodine and fluorine; and $n$ is an integer of at least 1; and a compound having the formula:

$$ZR_nX_{2-n}$$

wherein Z is zinc or cadmium; R is an aliphatic straight chain, branched chain or cyclic organic grouping having 1 to 10 carbon atoms; X is hydrogen or a halogen from the group of chlorine, bromine, iodine and fluorine; and $n$ is an integer of at least 1.

3. The method of claim 1 wherein the sealant agent is an alkoxide borane having the formula:

$$R_nB(OR')_{3-n}$$

wherein R is an aliphatic straight chain, branched chain or cyclic organic group having 1 to 10 carbon atoms, R' is an alkyl group having 1 to 3 carbon atoms, and $n$ is an integer 0 to 3.

4. The method of claim 1 wherein the sealant agent is an aluminum alkyl.

5. The method of claim 1 wherein the sealant agent is a zinc alkyl.

6. The method of claim 1 wherein the sealant agent is diethyl zinc.

7. The method of claim 1 wherein the sealant agent is triethylaluminum.

8. The method of claim 1 wherein the sealant agent is a mixture of triethyl aluminum and diethyl zinc.

9. The method of claim 1 wherein the sealant agent is trimethoxide borane.

10. The method of claim 1 in which the interior of said vessel is first purged to remove air and moisture therefrom.

11. The method of claim 10 in which the purge is performed by displacement by an inert gas.

References Cited
UNITED STATES PATENTS

| | | | |
|---|---|---|---|
| 2,990,295 | 6/1961 | Breining et al. | 117—107.2X |
| 3,114,970 | 12/1963 | Whitacre | 117—107.2X |
| 3,198,167 | 8/1965 | Barkish et al. | 117—107.2X |
| 3,508,962 | 4/1970 | Monasevit et al. | 117—107.2X |

ALFRED L. LEAVITT, Primary Examiner

E. G. WHITBY, Assistant Examiner

U.S. Cl. X.R.

117—95, 106, 107.2; 138—97; 106—33